United States Patent Office 3,406,124
Patented Oct. 15, 1968

3,406,124
PREPARATION OF CRYSTALLINE ALUMINOSILICATE CONTAINING COMPOSITE CATALYST
Sylvander C. Eastwood, Woodbury, N.J., and Albert B. Schwartz, Philadelphia, Pa., assignors to Mobil Oil Corporation, a corporation of New York
No Drawing. Filed Nov. 17, 1965, Ser. No. 508,384
12 Claims. (Cl. 252—455)

ABSTRACT OF THE DISCLOSURE

An alumina containing clay is leached to remove a portion of the alumina as soluble aluminum salts, the aluminum salts are precipitated in situ as aluminum hydroxide on the clay, particles of a crystalline aluminosilicate are admixed therewith, and the mixture is shaped into discrete, composite bodies having catalytic activity for cracking hydrocarbons.

---

The present invention relates to catalyst compositions and to methods for making such compositions. More specifically, the present invention relates to methods for producing and utilizing composite catalysts comprising a crystalline aluminosilicate component and a clay matrix component.

It has recently been discovered that materials of the class of crystalline aluminosilicates possess catalytic activity for a wide range of organic conversion reactions, such as catalytic cracking of petroleum, isomerization, alkylation, polymerization and for numerous other reactions. In many instances, and especially in the case of catalytic cracking, the activity of the crystalline aluminosilicates has been found to be many times that of conventional cracking catalysts. For example, certain specific crystalline aluminosilicates have been found to have activities on the order of several thousand times the activity of conventional amorphous silica-alumina gel cracking catalysts.

Present catalytic methods and apparatus are not adapted to take full advantage of such catalysts. Therefore, in order to make use of the crystalline aluminosilicate catalysts in available cracking operations and in other catalytic systems, a number of methods have been developed for modifying their catalytic activity. Such methods include steam treating, ion-exchanging, mixing with less active materials and the formation of composites comprising the highly active crystalline aluminosilicate component and a less active matrix component.

In the production of composite catalysts of the type in question, the primary method heretofore employed has consisted of incorporating small particles of the active component into gel-forming solutions and then setting the gel in the form of spheres or beads which enclose the active particles. While this method produces a satisfactory composite catalyst, effort has continued to be expended in this area to develop a lower cost product which would still have the desired activity and physical properties, and which could readily be produced in either bead or fluid catalyst form.

Accordingly, it is an object of the present invention to provide a new composite catalyst comprising an active crystalline aluminosilicate component and a less active matrix component, the product being economical to produce and having good attrition resistance whether in the form of beads, pellets, granules, or microspheres.

Another object of the present invention is to provide an efficient and economical method for producing composite catalysts comprising active crystalline aluminosilicate and less active components, the product being characterized by good attrition resistance.

A further object of the present invention is to provide an improved method for carrying out hydrocarbon conversion reactions.

The manner in which the above objects and other highly desirable objects and advantages are achieved in accordance with this invention will be apparent in the light of the following detailed description.

In general, the present invention comprises a catalyst which is a composite containing up to about 90% by weight and preferably from about 3% to 50% by weight of a crystalline aluminosilicate and the balance an alumina containing clay matrix which has been leached with acid or caustic and neutralized prior to compositing.

The invention further comprises a method for producing such composite catalysts which generally entails leaching an alumina containing clay matrix material with an acid or caustic solution to remove a small amount of alumina from the structure of the clay. The resulting solution aluminum compound is then precipitated in situ by neutralization with an acid or base producing aluminum hydroxide which serves as a binder for the clay and results in the production of a strong, attrition resistant composite product.

The treated clay matrix material is then mixed with particles of finely divided crystalline aluminosilicate and is formed into pellets, beads, granules or microspheres.

The starting matrix material is an alumina containing clay, such as kaolin or halloysite. Other suitable clays include bentonites, montmorillonite, ball clay and the like.

The first step in the process comprises mixing the clay from storage with an inorganic acid or a caustic solution in a digestion treatment to leach alumina from the structure of the clay. A concentrated alkali metal hydroxide, such as 50 weight percent NaOH, is the preferred reagent. The leaching is carried out until from about 2 weight percent to 30 weight percent and preferably from 5 weight percent to 20 weight percent of the alumina, based on weight of finished catalyst, in the clay is leached out as metal aluminate. A minor amount of silica may also be leached out of the clay in this step.

The clay and metal aluminate is then neutralized. Where an alkaline leaching agent is used, an acid neutralizing reagent, such as 10 weight percent sulfuric acid solution, is employed to precipitate aluminum hydroxide on the clay. Of course, when the leaching agent is acidic, an alkaline neutralizing agent will be employed.

Representative alkaline leaching agents include sodium, potassium, lithium hydroxide, and tetramethyl ammonium hydroxide. Representative acidic leaching agents include hydrochloric, sulfuric, nitric, phosphorus, formic, acetic and hydrofluoric acid. Suitable acidic neutralizing agents include hydrochloric, sulfuric, nitric, phosphoric, formic, acetic and hydrofluoric acid; and acid salts such as sodium bisulfate. Suitable alkaline neutralizing agents include sodium potassium, lithium, or calcium hydroxide, ammonium or tetramethyl ammonium hydroxide, and basic salts such as sodium carbonate and calcium carbonate.

The precipitated aluminum hydroxide subsequently acts as a binder for the clay and results in the production of an attrition resistant composite product. It is desirable to maintain or reduce the pH to below about 8 and preferably from about 4.5 to 8.0 during the neutralization to minimize zeolitic alkali metal or alkaline earth metal in the clay.

In addition to the aluminum hydroxide precipitated in situ, other binders may be added separately to the clay, such as metal hydroxides, metal salts, silica, organometallic compounds and the like.

Dispersants may also be added to deflocculate the clay.

Suitable dispersants for this purpose include, for example, lignosulfonates, phosphates, silicates, tannins, carboxymethyl cellulose, natural gums, various polyelectrolytes and the like.

The clay can be washed free of soluble salts or may be treated by ion-exchange methods to remove harmful alkali metals which may be present. The dispersants and binders are added after the clay is purified or both before and after the purification of the clay.

The composite may be further mixed with from 3% to 50% by volume based on the finished product of dry fine solids, preferably less than 20 micron particle size and ideally less than 10 microns particle diameter, for moving bed catalyst particles, or less than 1 micron for fluid catalyst particles. The fine particles of catalyst produced during the various stages of processing can be used in this instance. The fine particles are added to reinforce the composite catalyst and to reduce material loss.

The resulting composite may also contain weighting agents, in place of or in addition to the fine particle size additions just mentioned. Examples of weighting agents include metal powders, metal oxides or metal salts such as: barytes, zircon, titania, barium titanate and alpha alumina.

The clay and precipitated aluminum hydroxide is then filtered, washed, dried and is mixed with a suitable proportion of crystalline aluminosilicate and with water until a uniform mixture is obtained.

The crystalline aluminosilicate component preferably has a free alkali metal content of below about 3% by weight and preferably below 1% by weight.

It is also preferable to precalcine or heat treat the active component before mixture with the clay to reduce the moisture content to between about 1% and 5% to fix any cations in the structure and thereby stabilize the structure of the aluminosilicate.

The particle size of the crystalline aluminosilicate component should be below 40 microns in diameter. A particle diameter of less than 10 microns is preferable and best results are obtained where the particle size is below 2 microns.

Any catalytically active crystalline aluminosilicate may be employed in the invention. The term crystalline aluminosilicate is meant to include materials known as crystalline zeolites and molecular sieves and having the following general formula expressed in terms of oxides:

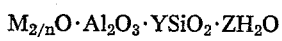
$$M_{2/n}O \cdot Al_2O_3 \cdot YSiO_2 \cdot ZH_2O$$

in the salt form, where $n$ is the valence of the metal cation M, Y is the number of moles of $SiO_2$ and $ZH_2O$ is the water of hydration.

When dehydrated, the crystalline aluminosilicates retain their crystalline structure and are characterized by high porosity and surface area. They are capable of being ion-exchanged by conventional techniques to replace the original metal cations with hydrogen ions, other metal cations or combinations of metal cations and hydrogen ions.

Preferred crystalline aluminosilicates for use as the active component in the present composites are the hydrogen ion-exchanged forms of mordenite and mordenite related structures, such as dachiardite, ion-exchanged faujasites including natural faujasite and synthetic faujasite of either the X or Y type, especially the rare earth ion-exchanged forms, and also the ion-exchanged forms of synthetic zeolites L, D and T.

Examples of other suitable crystalline aluminosilicates for use in the invention include the following synthetic and natural materials and their ion-exchanged forms. Useful natural zeolites are paulingite, clinoptilolite, ferrierite, chabazite, gmelinite, levynite and offretite. Suitable synthetic materials include, for example, zeolites A and ZK-4.

The preparation of the above-noted synthetic X and Y type faujasites which are particularly useful in this invention is disclosed in detail in U.S. Patent 2,882,244 Milton, issued Apr. 14, 1959, and Belgian Patent 577,642 respectively.

In some cases it may be desirable to calcine or heat treat the active crystalline aluminosilicate prior to compositing. The precalcination of the active crystalline aluminosilicate may also be conducted in a variety of atmospheres including air, steam, hydrogen, nitrogen, flue gas, etc.

The mixture of treated clay and crystalline aluminosilicate particles in water may be extruded into the form of relatively large pellets or may be spray dried to form fluidizable particles. Some adjustments of the moisture content may be desirable to obtain optimum results by the alternate methods.

Where the mixture is extruded into pellet form, subsequent processing comprises partial drying, tumbling to round the edges of the pellets, screening to size, and preferably calcining. Oversize pellets and fines separated in the screening step may be recycled to the mixing step. The drying step may be carried out at 150° F. to 500° F. for about 1 second to 24 hours.

Where fluid particles are formed by spray drying, they may be used without further treatment. Alternately, the spray dried catalyst bodies may be calcined before use.

The catalysts of the present invention may be calcined in heated air at a temperature in the range of from 1000 F. to 1600° F. for a suitable period of time, e.g., ¼ to 24 hours. Other atmospheres may also be used for drying the catalyst, such as steam, flue gas, nitrogen and hydrogen.

The catalysts of the present invention find extensive utility in a wide variety of hydrocarbon conversion processes in which known bead type catalysts and fluid catalysts have found use. Such hydrocarbon conversion processes include isomerization, alkylation, polymerization, hydrogen transfer, dehydration, hydrogenation, hydroforming, reforming, hydrocracking, and the like. The catalysts are useful in the above and related processes carried out over a wide range of conditions varying of course as is known in the art depending upon the particular reaction. Such conditions include temperatures ranging from ambient temperatures of 70° F. up to about 1400° F., pressures ranging from 0 to 1000 p.s.i.g. and space velocities (LHSV) from 0.2 to 5000.

Hydrocracking of heavy petroleum residual stocks, cycle stocks, etc., may be carried out with active aluminosilicates promoted with about 0.05 to 10 percent by weight of a platinum metal such as platinum, palladium, rhodium, osmium, iridium and ruthenium. The petroleum feed stock is cracked in the presence of the catalyst at temperatures between 400° F. and 825° F. using molar ratios of hydrogen to hydrocarbon charge in a range between 2 and 80. The pressure employed will vary between 10 and 2500 p.s.i.g. and the space velocity between 0.1 and 10. Other typical operating conditions are disclosed in Patent No. 3,140,253, issued July 7, 1964, to Plank et al., and such disclosure is incorporated herein by reference.

The present invention will be better appreciated in the light of the following non-limiting examples which are given for purposes of illustration.

EXAMPLE 1

1151 g. of Georgia kaolin (86.8 wt. percent solids) was added to 3849 g. water while stirring. Then 51.0 g. of NaOH in the form of a 50 weight percent solution was added. The slurry was heated to 200° F. and digested at 200° F. for one hour. The slurry was cooled to 150° F., and 62.5 g. $H_2SO_4$ (as a 19.6 wt. percent $H_2SO_4$ solution) was added while stirring to reduce pH to 5.2. Additional NaOH was added to bring the pH back to 7.0. The slurry was filtered and washed free of soluble salts. The filter cake was mixed with 112 g. of rare earth exchanged X-aluminosilicate (0.3 weight percent Na, 27.4 weight percent $Re_2O_3$) and mixed with addition of enough water to make a plastic mass. The composite was extruded into pellets and dried at 250° F. The dried pellets were steam treated for 24 hours at 1200° F. in 15 p.s.i.g. steam. The steam treated pellets were tested in the CAT-D test with the following results:

| | |
|---|---|
| Conversion, vol. percent | 58.8 |
| $C_4$ free gasoline, vol. percent | 45.9 |
| $C_4$, vol. percent | 13.8 |
| Dry gas, weight percent | 5.4 |
| Coke, weight percent | 3.7 |

EXAMPLE 2

A filter cake containing rare earth exchanged X-aluminosilicate, clay and alumina was prepared according to the procedure of Example 1. Enought water was added to make the mixture pumpable. The slurry was fed to a spray dryer operating with a gas effluent temperature of about 350° F. The spray dried catalyst particles can be used directly or after calcination.

What is claimed is:

1. A method for preparing a composite catalyst including an active crystalline aluminosilicate component and a relatively isert alumina containing clay component comprising leaching from about 2 to 30 weight percent of alumina, based on the weight of the composite catalyst, from said clay in the form of aluminum salts in solution, treating said soluble aluminum salts to precipitate aluminum hydroxide in situ on said clay, mixing said clay and said precipitated aluminum hydroxide with particles of a crystalline aluminosilicate to form a substantially uniform mixture, and shaping said mixture into discrete, composite catalyst bodies.

2. The method of claim 1 further comprising drying said composite catalyst bodies at about 150° to 500° F.

3. The method of claim 1 wherein said shaping is accomplished by extruding said mixture into the form of pellets.

4. The method of claim 1 wherein said shaping is accomplished by spray drying said mixture.

5. The method of claim 1 further comprising calcining said composite catalyst bodies for a period of about ¼ to 24 hours at about 1000° F. to 1600° F.

6. A method for preparing a composite catalyst including an active crystalline aluminosilicate component and a kaolin component comprising leaching from about 2 to 30 weight percent of alumina, based on the weight of the composite catalyst, from said clay in the form of aluminum salts in solution, adjusting the pH of said solution containing said soluble aluminum salts to between about 4.5 to 8.0 to precipitate aluminum hydroxide in situ on said kaolin, mixing said kaolin and precipitated aluminum hydroxide with particles of said crystalline aluminosilicate to form a uniform mixture, and shaping said mixture into discrete composite bodies of catalyst of the desired size.

7. The method of claim 6 wherein said shaping is accomplished by extruding said uniform mixture into the form of pellets.

8. The method of claim 6 wherein said shaping is accomplished by spray drying said uniform mixture.

9. The method of claim 6 further comprising heat treating said composite bodies of catalyst for a period of from ¼ to 24 hours at a temperature of from 1000° F. to 1600° F.

10. A method for preparing a composite catalyst including an active crystalline aluminosilicate component and a clay component comprising contacting an aqueous slurry of said clay with a concentrated solution NaOH to leach from about 2 to 30 weight percent of alumina, based on the weight of the composite catalyst, from said clay as soluble sodium aluminate, neutralizing said sodium aluminate with acid to precipitate aluminum hydroxide in situ on said clay, mixing said clay and said precipitated aluminum hydroxide with particles of said crystalline aluminosilicate and sufficient water to form a substantially uniform mixture, extruding said mixture into the form of pellets, drying said pellets to reduce their water content to below about 0.35 lb. water/lb. solids, tumbling said pellets to round off their corners, and calcining said pellets for a period of about ¼ to 24 hours at a temperature of about 1000° F. to 1600° F.

11. A method for preparing a composite catalyst including an active crystalline aluminosilicate component and a kaolin component comprising contacting an aqueous slurry of said kaolin with a concentrated solution of NaOH to leach from about 2 to 30 weight percent of alumina, based on the weight of the composite catalyst, from said kaolin as soluble sodium aluminate, neutralizing said sodium aluminate with acid to precipitate aluminum hydroxide in situ on said kaolin, mixing said kaolin and said precipitated aluminum hydroxide with particles of said crystalline aluminosilicate and sufficient water to form a pumpable mixture, and spray drying said uniform mixture in the form of fluidizable particles.

12. A method for preparing a composite catalyst including an active crystalline aluminosilicate component and a clay component, comprising contacting an aqueous slurry of said clay with an alkaline leaching agent to leach from about 2 to 30 weight percent of alumina, based on the weight of the composite catalyst, from said clay and to obtain aluminum in soluble form, neutralizing the solubilized aluminum with acid to precipitate aluminum hydroxide in situ on said clay, mixing said clay and said precipitated aluminum hydroxide with particles of said crystalline aluminosilicate to form a substantially uniform mixture, and shaping said mixture into discrete, composite catalyst bodies.

References Cited

UNITED STATES PATENTS

| | | | |
|---|---|---|---|
| 2,865,867 | 12/1958 | Van Dyke et al. | 252—455 |
| 2,935,463 | 5/1960 | Secor et al. | 208—120 |
| 2,967,157 | 1/1961 | Robinson et al. | 252—450 |
| 3,065,054 | 11/1962 | Haden et al. | 252—455 X |
| 3,130,170 | 4/1964 | Stover et al. | 252—450 |
| 3,143,491 | 8/1964 | Bergstrom. | |
| 3,271,418 | 9/1966 | Plank et al. | 252—455 X |

DANIEL E. WYMAN, *Primary Examiner.*

C. F. DEES, *Assistant Examiner.*